(12) United States Patent
Cheng

(10) Patent No.: US 6,341,753 B1
(45) Date of Patent: Jan. 29, 2002

(54) FASTENING MECHANISM FOR SPEAKER

(75) Inventor: Ching-Che Cheng, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/637,166

(22) Filed: Aug. 14, 2000

(51) Int. Cl.[7] .............................................. F16M 11/00
(52) U.S. Cl. ..................................... 248/200; 248/918
(58) Field of Search ............................. 248/200, 231.9, 248/903, 906, 22.1, 205.1, 918, 442.2; 220/3.5, 3.6, 241; 361/150

(56) References Cited

U.S. PATENT DOCUMENTS

| | | | | |
|---|---|---|---|---|
| 4,445,228 A | * | 4/1984 | Bruni .......................... 381/24 |
| 4,685,035 A | * | 8/1987 | Nanjoh ........................ 361/429 |
| 5,092,810 A | * | 3/1992 | Kwan et al. ................. 446/268 |
| 5,303,892 A | * | 4/1994 | Minder et al. ........... 248/231.9 |
| 5,330,144 A | * | 7/1994 | Stevenson et al. ....... 248/231.9 |
| 5,805,071 A | * | 9/1998 | Hur ............................ 340/693 |
| 5,973,916 A | * | 10/1999 | Han ........................... 361/682 |
| 6,067,224 A | * | 5/2000 | Nobuchi ..................... 361/683 |
| 6,222,725 B1 | * | 4/2001 | Jo .............................. 361/683 |

\* cited by examiner

Primary Examiner—Ramon O. Ramirez
Assistant Examiner—A. Joseph Wujciak
(74) Attorney, Agent, or Firm—Birch, Stewart, Kolasch & Birch, LLP

(57) ABSTRACT

A fastening mechanism for fastening a speaker to a PC is disclosed. The mechanism comprises a fastener and a bracket including a clamp member on one side having a top plate, a side plate, a front plate, and a rear plate and a plate member having a threaded hole on the other opposed side wherein the first wing member of the speaker is clung in the gap formed between the front plate and the rear plate, and the second wing member of the speaker is secured to the bracket by threading the fastener through the hole of the second wing member of the speaker and the threaded hole of the plate member. With this, only one fastener is used while still maintaining a secure fastening as well as it is possible to increase yield of computer assembly.

6 Claims, 3 Drawing Sheets

FASTENING MECHANISM FOR SPEAKER

BACKGROUND OF THE INVENTION

1. Field of Invention

The present invention relates to fasteners and more particularly to a mechanism having a single fastener for fastening a speaker to a personal computer (PC).

2. Related Art

Conventionally, speaker is mounted on a bracket of a PC by means of a plurality of fasteners such as screws, bolts, or plastic pins. For example, in mounting a typical speaker an assembler has to secure each of two wing members of speaker to bracket of PC by means of a bolt. This process is slow due to the mounting of bolts. Further, it adversely affects the flow of assembly line.

Thus, it is desirable to provide a novel fastening mechanism for fastening a speaker to a PC in simple quick manner in order to overcome the above drawbacks of prior art.

SUMMARY OF THE INVENTION

It is therefore an object of the present invention to provide a fastening mechanism for fastening a speaker to a personal computer (PC) wherein the number of fasteners used is as small as possible while still maintaining a secure fastening.

The advantages of the present invention are realized by providing a fastening mechanism for fastening a speaker to a PC. The fastening mechanism comprises a fastener and a bracket including a clamp member on one side having a top plate, a side plate, a front plate, and a rear plate and a plate member having a threaded hole on the other opposed side wherein the first wing member of the speaker is clung in the gap formed between the front plate and the rear plate, and the second wing member of the speaker is secured to the bracket by threading the fastener through the hole of the second wing member of the speaker and the threaded hole of the plate member. By utilizing this fastening mechanism, only one fastener is used while still maintaining a secure fastening. Further, the flow of computer assembly line is much smooth by reducing the time of mounting fastener.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow illustration only, and thus are not limitative of the present invention, and wherein.

DETAILED DESCRIPTION OF THE INVENTION

Figure 1:
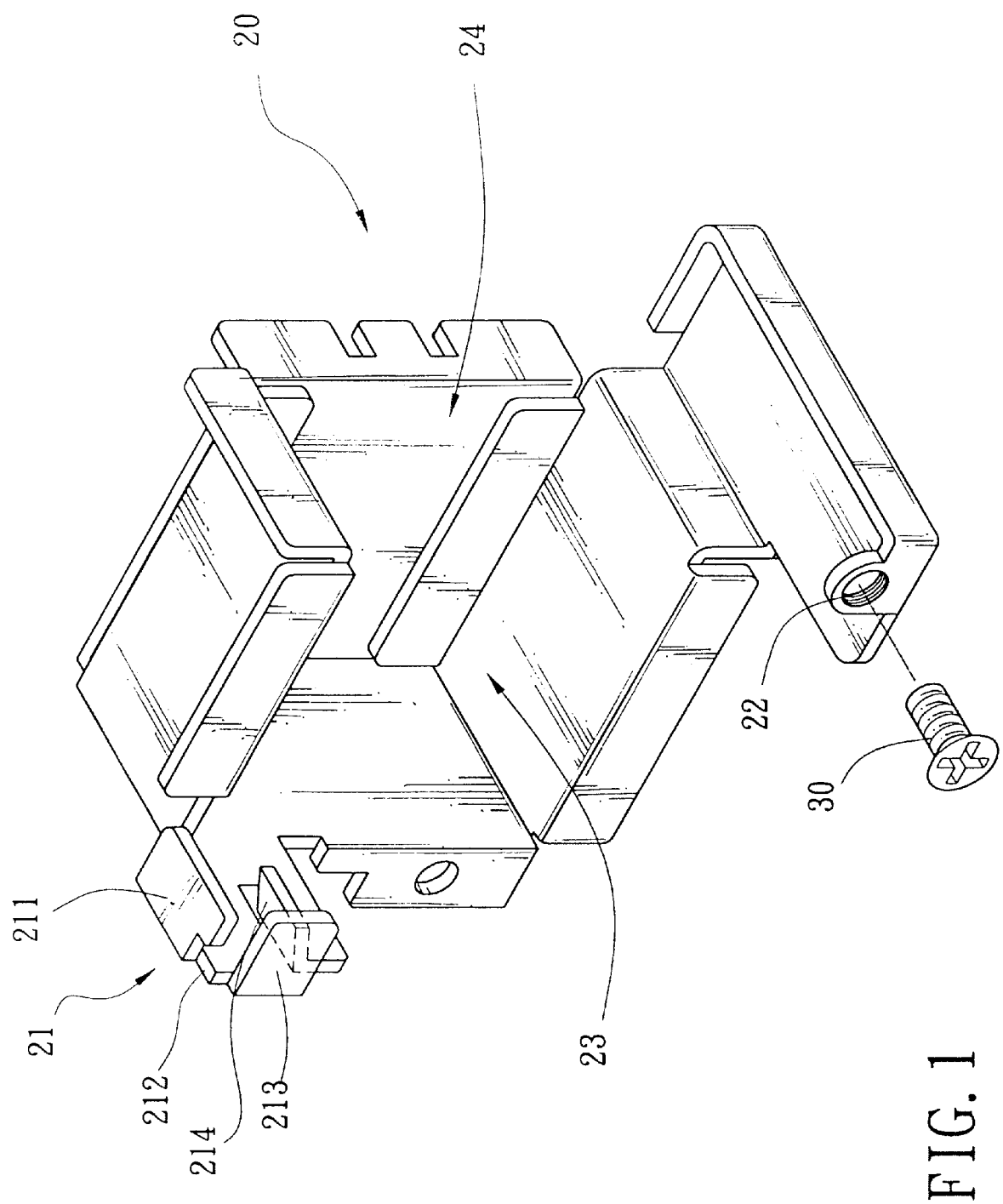
FIG. 1 is a perspective view of a fastening mechanism according to the invention.

Referring to FIG. 1, there is shown a fastening mechanism for fastening a speaker to a PC. The fastening mechanism constructed in accordance with the invention comprising a bracket 20 and a fastener 30 as detailed below.

Bracket 20 is generally a parallelepiped hollow frame with first and second open sides 23 and 24. Bracket 20 comprises a clamp member 21 on one side and a member having a threaded hole 22 on the other opposed side. Clamp member 21 is projected adjacent the first open side 23. Clamp member 21 comprises a top plate 211, a side plate 212, a front plate 213, and a rear plate 214 wherein side plate 212 is extended from bracket 20 with its top side attached to top plate 211 and its front side attached to front plate 213 respectively. As such, top plate 211, side plate 212, and front plate 213 consists of the three sides of clamp member 21. Rear plate 214 is extended from the bottom of side plate 212 being curved inward.

Figure 2:
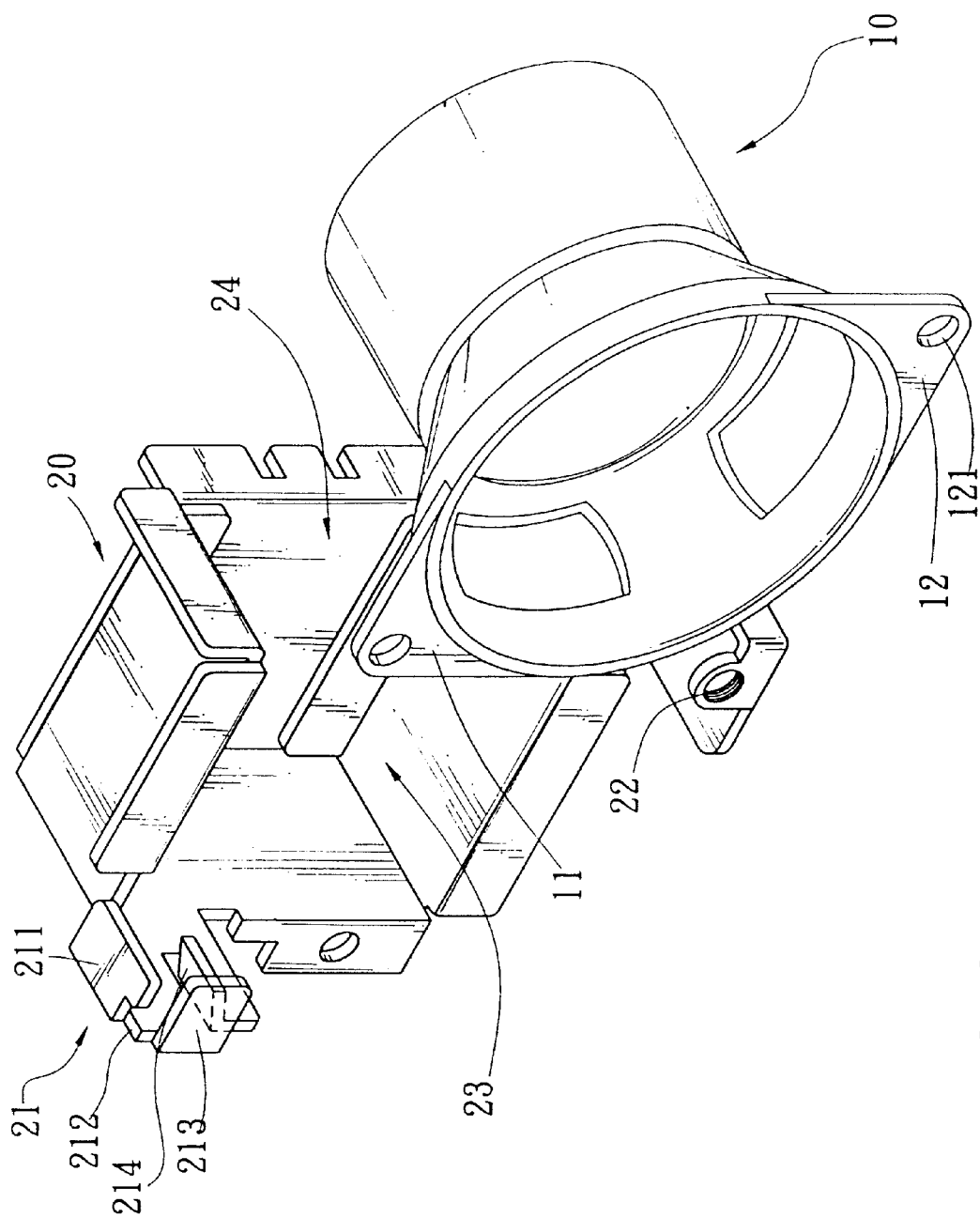
FIG. 2 is similar to FIG. 1, the speaker being shown during mounting.
Figure 3:
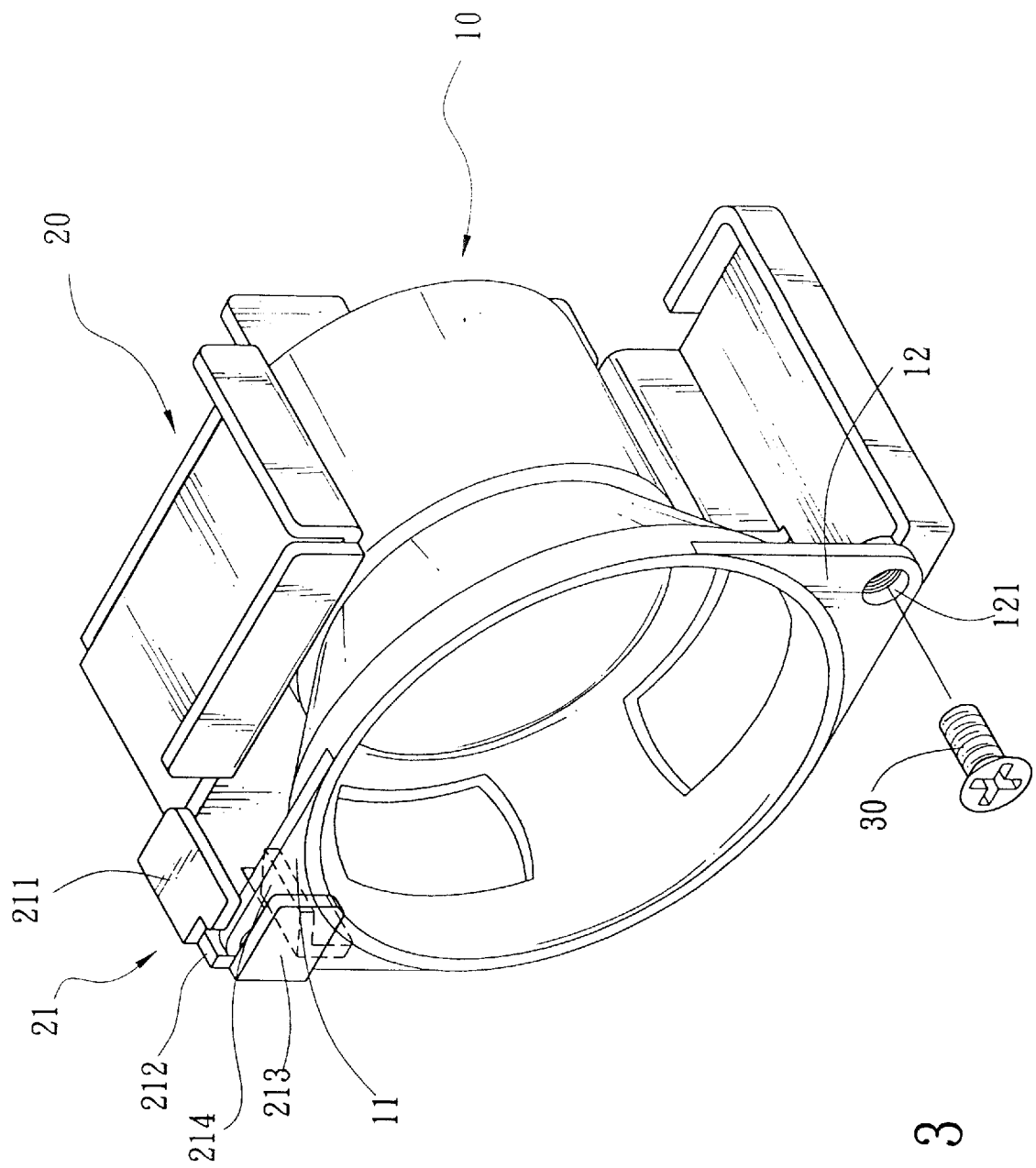
FIG. 3 is similar to FIG. 2, where speaker being mounted.

FIGS. 2 and 3 illustrate the assembly of speaker 10 to bracket 20. First, put speaker 10 in bracket 20 from the second open side 24 toward the first open side 23 with the front grille portion of speaker 10 faced forward. Then align first wing member 11 of speaker 10 with the gap formed between front plate 213 and rear plate 214 in the clamp member 21 until wing member 11 is clung in the gap (see FIG. 3). Then align the hole 121 of second wing member 12 with the threaded hole 22. Finally, secure second wing member 12 to bracket 20 by threading a fastener (e.g., bolt or plastic pin) 30 through the hole 121 and the threaded hole 22.

The provision of top plate 211 and side plate 212 can prevent speaker 10 from pivoting clockwise or counter-clockwise with respect to fastener 30. Preferably, the thickness of first wing member 11 is about the same as that of the gap between front plate 213 and rear plate 214 so as to fasten first wing member 11 in the gap by taking advantage of the friction therebetween.

The benefits of this invention includes:

1. Only one fastener is used while still maintaining a secure fastening.
2. The flow of computer assembly line is much smooth by reducing the time of mounting fastener.

The invention being thus described it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fastening mechanism for fastening a speaker to a personal computer (PC), the speaker having a first wing member and a second wing member with a hole therethrough, the fastening mechanism comprising:

a fastener; and a bracket including a clamp member on one side having a top plate, a side plate, a front plate, and a rear plate and a plate member having a threaded hole on the other opposed side;

wherein the first wing member of the speaker is clung in a gap formed between the front plate and the rear plate, and the second wing member of the speaker is secured to the bracket by threading the fastener through the hole of the second wing member of the speaker and the threaded hole of the plate member.

2. The fastening mechanism of claim 1, wherein the rear plate is extended from the bottom of the side plate being curved inward.

3. The fastening mechanism of claim 1, wherein the thickness of the first wing member is about the same as that of the gap between the front plate and the rear plate.

4. The fastening mechanism of claim 1, wherein the bracket is substantially a parallelepiped hollow frame with a first and a second open sides.

5. The fastening mechanism of claim 1, wherein the fastener is a bolt.

6. The fastening mechanism of claim 1, wherein the fastener is a plastic pin.

* * * * *